US012326736B2

(12) United States Patent
Mani et al.

(10) Patent No.: US 12,326,736 B2
(45) Date of Patent: Jun. 10, 2025

(54) UNMANNED AERIAL VEHICLE (UAV) AND METHOD FOR OPERATING THE UAV (71) Applicant: DIGIT7 INDIA PRIVATE LIMITED, Richardson, TX (US)

(72) Inventors: Chithrai Selvakumar Mani, Richardson, TX (US); Gaurav Shukla, Dallas, TX (US)

(73) Assignee: DIGIT7 INDIA PRIVATE LIMITED, Richardson, TX (US)

( * ) Notice: Subject to any disclaimer, the term of this patent is extended or adjusted under 35 U.S.C. 154(b) by 231 days.

(21) Appl. No.: 17/818,534

(22) Filed: Aug. 9, 2022

(65) Prior Publication Data

US 2023/0052288 A1     Feb. 16, 2023

Related U.S. Application Data (60) Provisional application No. 63/260,217, filed on Aug. 12, 2021.

(51) Int. Cl.
```
G05D 1/00      (2024.01)
B64U 10/13     (2023.01)
B64U 101/30    (2023.01)
G06T 7/579     (2017.01)
G06T 17/05     (2011.01)
```
(52) U.S. Cl.
CPC .............. *G05D 1/106* (2019.05); *B64U 10/13* (2023.01); *G06T 7/579* (2017.01); *G06T 17/05* (2013.01); *B64U 2101/30* (2023.01); *B64U 2201/10* (2023.01); *G06T 2207/10028* (2013.01); *G06T 2207/10032* (2013.01)

(58) Field of Classification Search
CPC ......... G05D 1/106; G06T 7/579; G06T 17/05; G06T 2207/10028; G06T 2207/10032; B64C 39/024; B64U 2201/10; B64U 2101/30

See application file for complete search history.

(56) References Cited

U.S. PATENT DOCUMENTS

| | | |
|---|---|---|
| 2018/0094935 A1 | 4/2018 | O'Brien et al. |
| 2019/0051198 A1* | 2/2019 | Nimmagadda ...... G05D 1/0217 |
| 2019/0265705 A1 | 8/2019 | Zhang et al. |

OTHER PUBLICATIONS

India Patent Office as IPEA; Written Opinion of the International Preliminary Examining Authority; PCT/IPEA/408; Aug. 4, 2023.
Das, Sagarnil; Simultaneous Localization And Mapping (SLAM) using RTAB-Map; arXiv; Sep. 9, 2018.

(Continued)

*Primary Examiner* — Michael D Lang
(74) *Attorney, Agent, or Firm* — Steven H. Washam; Washam IP (57) ABSTRACT

An improved UAV system and methods for operation in an inventory management system. The methods include generating a three dimensional (3D) map and estimating a position and orientation of the UAV based upon this map; autonomously navigating the UAV in the environment by using the generated 3d map in conjunction with the position and the orientation of the UAV; performing static and dynamic obstacle avoidance in the environment using collision avoidance; and finding the optimal path from a source node to a destination node within the environment.

18 Claims, 5 Drawing Sheets

(56) References Cited

OTHER PUBLICATIONS

Forster, Christian and Carlone, Luca and Dellaert, Frank and Scaramuzza, Davide; On-Manifold Preintegration for Real-Time Visual-Inertial Odometry; Oct. 31, 2015; Robotics and Perception Group, University of Zurich, Switzerland.
Forster, Christian and Pizzoli, Matia and Scaramuzza, Davide; SVO: Fast Semi-Direct Monocular Visual Odometry; 2014; IEEE International Conference on Robotics and Automation (ICRA), Hong Kong.
Forster, Christian and Zhang, Zichao and Gassner, Michael and Werlberger, Manuel and Scaramuzza, Davide; SVO: Semi-Direct Visual Odometry for Monocular and Multi-Camera Systems; Nov. 20, 2015; Robotics and Perception Group, University of Zurich, Switzerland.
Luo, Wei & Tang, Qirong & FU, Changhong & Eberhard, Peter; Deep-Sarsa Based Multi-UAV Path Planning and Obstacle Avoidance in a Dynamic Environment; Jun. 2018; ResearchGate; US.
M. Pizzoli, C. Forster, D. Scaramuzza; Remode: Probabilistic, Monocular Dense Reconstruction in Real Time; 2014; IEEE International Conference on Robotics and Automation (ICRA), Hong Kong.
Scaramuzza, Davide and Zhang, Zichao; Visual-Inertial Odometry of Aerial Robots; 2019; Springer Encyclopedia of Robotics; US.
Zhang, Baosheng; PLD-SLAM: A Real-Time Visual SLAM Using Points and Line Segments in Dynamic Scenes; arXiv; Jul. 22, 2022; US.
Zhang, Zichao and Gallego, Guillermo and Scaramuzza, Davide; On the Comparison of Gauge Freedom Handling in Optimization-based Visual-Inertial State Estimation; IEEE Robotics and Automation Letters. Preprint Version. Accepted Apr. 2018.
Zhang, Zichao and Scaramuzza, Davide; A Tutorial on Quantitative Trajectory Evaluation for Visual(-Inertial) Odometry; 2018 IEEE/RSJ International Conference on Intelligent Robots and Systems (IROS), Oct. 1-5, 2018, Madrid, Spain.
Zhang, zichao and Scaramuzza, Davide; Beyond Point Clouds: Fisher Information Field for Active Visual Localization; Feb. 28, 2019; Robotics and Perception Group, University of Zurich, Switzerland.
Zhang, Zichao and Scaramuzza, Davide; Rethinking Trajectory Evaluation for SLAM: a Probabilistic, Continuous-Time Approach; 2019; ICRA Workshop on Dataset Generation andBenchmarking of SLAM Algorithms for Robotics and VR/AR, Montreal.
Zichao Zhang, Christian Forster, Davide Scaramuzza; Active Exposure Control for Robust Visual Odometry in HDR Environments; 2017; Robotics and Perception Group, University of Zurich, Switzerland; available online at: https://rpg.ifi.uzh.ch/svo_pro.html.
WIPO IPEA (India); PCT/IPEA/409 International Preliminary Report on Patentability; Dec. 11, 2023; WIPO.
Form PCT/ISA/210 International Search Report.
Form PCT/ISA/237 Written Opinion of the ISA.
PCT/ISA/220 Notification Of Transmittal of the ISR and WO of the ISA.

* cited by examiner

UNMANNED AERIAL VEHICLE (UAV) AND METHOD FOR OPERATING THE UAV

CROSS-REFERENCE TO RELATED APPLICATIONS

This application claims the benefit of U.S. provisional patent application Ser. No. 63/260,217, filed Aug. 12, 2021.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A "SEQUENCE LISTING", A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

Not Applicable

BACKGROUND OF THE INVENTION

In general, warehouse management is performed manually by a staff member, making the process slow and vulnerable to errors. However, with the advancement of technology the use of drones in a warehouse management system/inventory management system is becoming a viable option. Still, typical drones have limitations that preclude or substantially limit such use. For example, drone navigation is typically dependent upon the Global Positioning System (GPS). However, an indoor environment such as a warehouse does not afford adequate, reliable access to the GPS signal.

Moreover, existing flight planning algorithms consider flight planning only in a two dimensional (2D) space without taking into account object avoidance. Existing technologies also rely on two dimensional (2D) Lidar ("light detecting and ranging") devices, which, likewise, are not helpful with three-dimensional (3D) object space mapping. Existing 3D Lidars and support circuitry are not helpful as they add substantial weight and power demand to such drones, dramatically limiting the payload and overall operating efficiency and usefulness. Accordingly, given the above shortcomings and others that will become apparent after an understanding of the detailed disclosure, there remains a need for a robust drone system and method of its use for operating in an advanced inventory management system.

TECHNICAL FIELD

The invention relates to inventory management devices and methods, and, more specifically, to UAV devices and methods of operating same in the inventory management context.

BRIEF SUMMARY OF THE INVENTION

Embodiments herein disclose a UAV system including one or more cameras, one or more sensors, and at least one programmable processor. The processor is adapted to automatically generate a three dimensional (3D) object-space map and accurately estimate a position and orientation of the UAV within this environment, and to autonomously navigate the UAV in the environment (i.e., 3D object-space) using the generated 3D map, the position and the orientation of the UAV. Further, the processor is also adapted to perform static as well as dynamic obstacle avoidance in the environment using a collision prevention feature. Further, the processor is also adapted to find the optimal path from a source node to a destination node in the environment to increase UAV operational efficiency. Methods of operation are also disclosed to achieve these advancements. Processing of algorithms to perform these methods can be performed wholly internal to (onboard) the UAV or some portion or all may be performed external to the UAV, for example, by a web application running in a remote server or a mobile application running in an electronic device in communication with the UAV.

The novel features that are considered as characteristic for the invention are set forth particularly in the appended claims. The invention itself, however, both as to its construction and methods of operation, together with additional objects and advantages thereof, will be best understood from the following description of specific embodiments when read with the accompanying drawings.

BRIEF DESCRIPTION OF THE SEVERAL VIEWS OF THE DRAWING(S)

The present invention may be more fully understood by reference to the following detailed description of the preferred embodiments of the invention when read in conjunction with the accompanying drawings, wherein.

The above figures are provided for illustration and description only, and are not intended to limit the disclosed invention. Use of the same reference number in multiple figures is intended to designate the same or similar parts. Furthermore, if, and when, the terms "top," "bottom," "first," "second," "upper," "lower," "height," "width," "length," "end," "side," "horizontal," "vertical," and similar terms are used herein, these terms are intended to reference only the structure shown in the drawing to facilitate describing the specific embodiment.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The terms "inventory management system" and "warehouse management system" are used interchangeably herein.

Embodiments provide methods for operating the UAV in the inventory management system. The method includes generating a 3D map. Further, the method includes estimating a spatial position and orientation of the UAV. The spatial position serves as a location current node for the UAV. Further, the method includes autonomously navigating the UAV in the environment by using the generated 3d map, the position and the orientation of the UAV. Further, the method includes performing static as well as dynamic obstacle avoidance in the environment using the collision prevention feature. Further, the method includes finding the shortest or optimal path from a start or source node (first node) to a destination node (second node) in the environment.

Unlike conventional methods, the proposed UAV makes an inventory management more efficient and cost effective. The UAV autonomously flies through a warehouse to collect live inventory data by visually or electronically scanning each item present in the shelves of the warehouse. Examples of inventory data collected by the UAV include, but are not limited to: item model number, serial number, quantity, location, expiration date, pricing, physical characteristics, operational characteristics, operating state, local environmental conditions, and the like. This substantially improves intelligent automation of warehouse operations.

In a first embodiment of the proposed UAV, one or more cameras are used to extract visual odometry and the flight position. The visual odometry is combined with the onboard inertial measurement unit data to provide accurate spatial positioning data, which is used to determine position of the UAV in the 3D space. Further, the UAV can avoid obstacles dynamically while flying with the help of onboard depth sensors.

This embodiment of the UAV has various features (e.g., 3D-based flight planning instead of 2D, GPS denied navigation capability, object avoidance embedded in a flight planning approach, self-generated 3D map compatibility or the like). The UAV can use any 3D map, from which it generates an efficient path. The UAV functions in an offline mode or an online mode. The offline mode means the drone is left to operate autonomously and there is no external monitoring of the drone operation, meaning the drone is performing all operational tasks by itself, without external control. Online mode means that it is being monitored and can be controlled externally, by a user or artificial intelligence (AI) if required. The UAV can be monitored/controlled remotely by using an electronic device and/or server. Further, a web application running on a server or a mobile application running on an electronic device can also control the UAV.

The UAV can be used in various locations. For example, use is envisioned in, but not limited to: retail convenience stores, supermarket and hypermarket chains, grocery store chains, sports and fashion apparel chains, major retailers, big box stores, specialty retailers, and the like.

Figure 1:
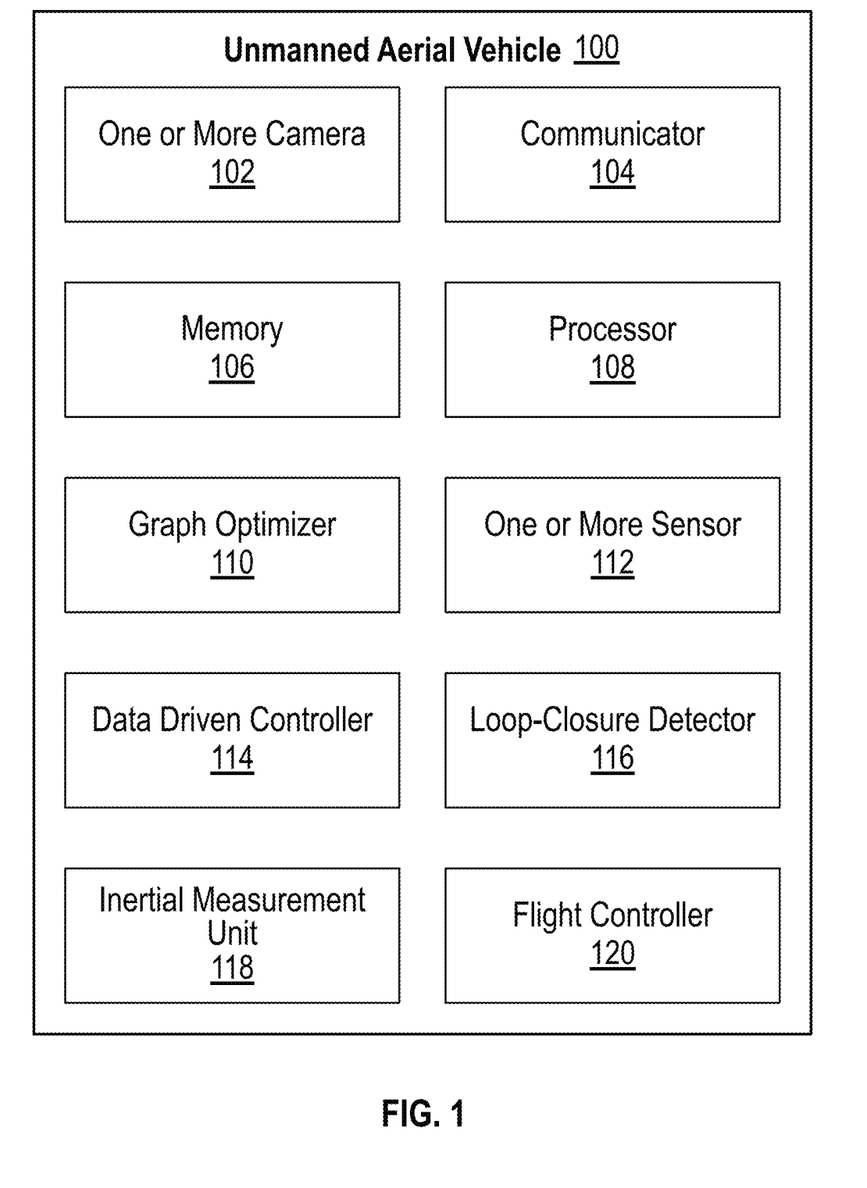
FIG. 1 shows various hardware components of an UAV, according to embodiments as disclosed herein.

Referring now to the drawings. FIG. 1 shows various hardware components of the UAV (100), according to embodiments as disclosed herein. The UAV (100) is a smart drone (e.g., single-rotor drone, multi-rotor drone, fixed-wing drone, fixed-wing hybrid drone, variable-wing drone, reconnaissance drone or the like) having processing and environmental sensing means. In an embodiment, the UAV (100) includes one or more camera (102) elements for detection of visible electromagnetic frequencies, at least one communicator (104) element, at least one memory (106) element, at least one processor (108) element, a graph optimizer element (110), one or more sensor (112) elements, a data driven controller (114) element, a loop-closure detector element (116), an inertial measurement unit element (118), and a flight controller element (120).

The processor (108) is communicatively coupled with the one or more camera (102) elements, the communicator (104) element, the memory (106), the graph optimizer element (110), the one or more sensor (112) elements, the data driven controller element (114), the loop-closure detector element (116), the inertial measurement unit element (118) and the flight controller element (120). Examples of the camera (102) device(s) include, but not limited to, a depth camera, tracking camera, a RGBD camera, stereo cameras, a time-of-flight (ToF) camera, an optical flow camera, a high resolution (4K) camera, or the like, or some combination thereof. The one or more sensor (112) devices include, but not limited to, time-of-flight (ToF) sensor, depth sensor, proximity sensor, electromagnetic field sensor, RFID sensor, or the like, or some combination thereof.

In the proposed embodiment, generation of three-dimensional (3D) map is a process of creating a map or continuously updating a spatial map representing an unknown environment, while keeping the track of the current physical location of the UAV (100) within this environment. To assist in achieving this the UAV (100) uses commonly understood and practiced Visual Slam (V-Slam, or "visual simultaneous localization and mapping") techniques, relying on input from the one or more camera (102) devices, and which thus helps in autonomous navigation. Further, the UAV (100) uses a graph-based approach, by using a graph optimizer (110) algorithm that works in conjunction with a loop-closure detection (116) algorithm receiving input from a depth camera and a tracking camera. This unique approach is extremely light weight in comparison to Lidar sensors used in conventional UAVs. Further, the proposed UAV (100) utilizes a loop closing algorithm to ensure the proposed UAV (100) may successfully return to a previous location.

The processor (108) receives input data from at least one tracking camera to generate odometry data and combines this with point cloud data coming from at least one RGBD camera to produce an accurate 3D map of the environment within which the drone operates. The odometry data includes use of data from one or more sensor (112) devices to estimate change in UAV position over time. Further, the proposed UAV (100) utilizes stereo cameras to detect depth (distance) as well as RGB data.

Figure 2:
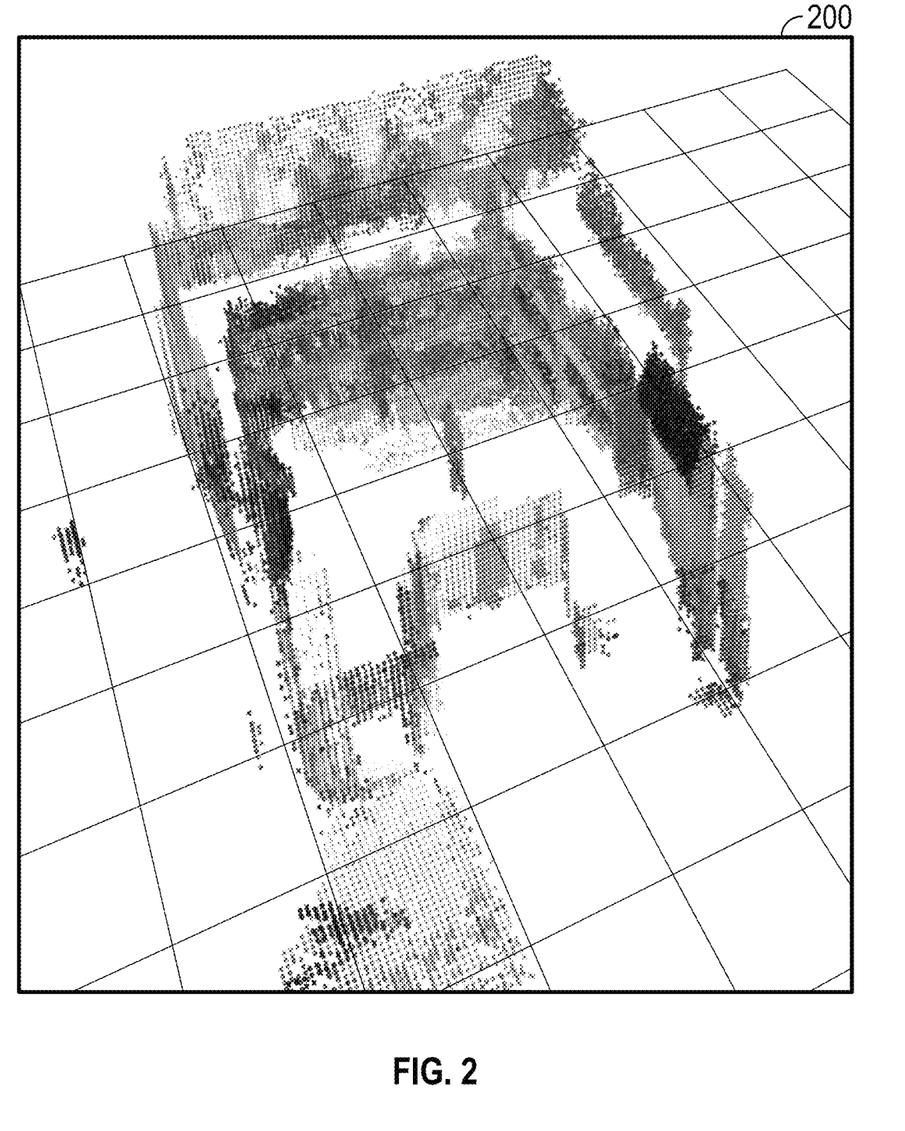
FIG. 2 is an example illustration in which a 3D map is depicted, according to embodiments as disclosed herein.

The UAV (100) begins flight from a start position, where the feature points are extracted from the RGB images and matched to be combined with the next image to find the best possible alignment between the frames. The odometry data coming from the tracking camera is the location of the UAV (100) in the X, Y, and Z axis of the operating environment, such that the location combined with the depth information from the stereo camera gives the location of the point cloud that is being created by the depth camera. The UAV (100) then determines if the new image coming from the one or more camera (102) is from a previous location or a new location. The graph optimizer (110) reduces the errors on the frame. For example, the 3D map (200) is depicted in FIG. 2. A memory management approach is used to limit the number of locations used for loop closure detection and graph optimization, so that real-time constraints on large-scale environments are always respected. Memory management is performed via keeping the most recent image/location and the most frequent in current memory buffer while pushing the older images and locations in long term memory of the drone. If there is a match between the current image/location and the image in current memory/location, all other associated images/locations in the long term memory are updated.

A stereo camera approximates human binocular vision, and therefore gives it the ability to capture three-dimensional images, a process commonly known as stereo photography. An optical flow camera uses ground texture and visible features to determine the UAV ground velocity and provides visual odometry data about the UAV location with respect to the UAV initial location. A 4K camera is a high-resolution camera used for monitoring the UAV visual feeds and to gauge the environment around the UAV (100) in greater detail.

Autonomous Navigation: To effect autonomous navigation, the UAV (100) estimates its position and orientation continually while moving in the unknown environment. This embodiment utilizes a technique called Visual-Inertial Odometry (VIO). The VIO receives information from the images generated by the one or more camera (102) devices and the inertial measurement unit (118) to determine odometry data or to estimate the physical position of the UAV (100). Stereo camera devices are also utilized to obtain data from sequences of images, continuously, as the UAV (100) moves. For every frame, a point cloud is built around the edges in the frame indicating where the UAV is in the frame. Similarly, a second image is processed and a similar point cloud is built. After application of image correction, feature detection takes place where the processor (108) matches features across the frames and an optical flow field is constructed. Simultaneously, the inertial measurement unit (118) communicates with the flight controller (120), providing inertial data with respect to movement in the object space, in all directions. The VIO algorithm determines the difference in the position of the UAV (100) relative to itself in the environment, and ascertains the difference between the two images to see how much the object has shifted, allowing the drone to localize itself within the environment space.

Obstacle Avoidance: Obstacle avoidance is one of the most prominent features of the UAV (100) embodiment, affording safe and successful navigation around obstacles encountered within the environment space. This collision prevention feature allows the UAV (100) to automatically slow and stop, preventing impact with an obstacle. The UAV (100) is initialized with a minimum allowed distance from the obstacle, or the minimum allowed distance is dynamically configured based on an initialization requirement. Obstacle distance information is sent from the stereo camera in communication with the flight controller (120). The UAV (100) begins braking (slowing) as soon as a nearby obstacle is detected as the UAV approaches the minimum allowed distance. An inventory management system (302) (as shown in the FIG. 3) (for example, an external computer, server, laptop, or the like) in communication with the flight controller (120) may help in both static as well as dynamic obstacle avoidance by providing known object location data, which can be correlated with detected object data.

Path Planning: Given the generated 3D point cloud, a source point and a destination point, the UAV (100) determines its optimal path to a destination in the 3D point cloud, avoiding all obstacles. The path planning algorithm is specific to the UAV (100) to assist it in its navigation by establishing a plurality of waypoints along the projected path. The UAV (100) changes its speed with respect to the turn angle [or] across the obstacle in its path. The UAV (100) slows its speed whenever there is a sharp turn, or if the angle is too tight, or continues to fly at its normal speed or faster if the turn radius allows or if it is a straight path with no obstacles.

When the UAV (100) is flying in a straight path, the distance between each waypoint is greater and so the UAV (100) doesn't have to reduce the speed as its trying to reach the distance at higher speed in a shorter amount of time. As soon as there is an obstacle in the path, or if there is a tight turn radius, the waypoints become more densely populated and the distance between each waypoint is reduced as the UAV (100) approaches the obstacle. The distance between waypoints is smallest around the obstacle. As a result, the UAV (100) reduces its speed based on the closeness of the waypoints. When the points are very near to each other, the UAV (100) travels very slow. As a result, the UAV (100) able to avoid any possible crash around the obstacle. Once the UAV (100) is clear of the obstacle the distance between waypoints increases and the UAV (100) is able to return to its high speed to continue the rest of the path.

The map generated from the SLAM algorithm is further converted to a point cloud and is loaded into the memory (106). A 3D grid is created for empty space in the voxel grid. Pre-processing is performed on every voxel in the empty grid to determine the clearance. After setting the source start point and the target end point, an A* Algorithm determines the optimal path from source point to the target point. Below are example algorithms for creation of a map object and a 3D grid, generation of the 3D grid, pre-processing for clearance, A* search algorithm implementation, finding the optimal path, and the data structures usage.

Creation of Map Object and 3D grid: Open3D library from PyPI may be utilized to load the ".ply" file into the program: (STEP 1) Import open3d as o3d; pcd=o3d.io.read_point_cloud (" . . . / . . . /testdata/fragment.ply"); (STEP 2) establish the maximum bounds (i.e. size of the point cloud): (maxboundx, maxboundy, maxboundz=pcd.getmaxbounds ( )); and (STEP 3) convert the map object to a Voxel Grid using specific voxel size: voxel grid=o3d.geometry.VoxelGrid.create_from_point_cloud (pcd, voxel size=0.05). This voxel grid object does not have the 3d grid stored in it. However, the user of the UAV (100) can determine if a voxel exists given a point in 3d space. Using this information, the 3D grid is generated.

Generating 3D Grid: First, the UAV (100) must determine the dimensions of the grid. As the UAV (100) is initialized with maximum bounds from point [[s]] cloud and size of voxel, the voxel grid dimension are determined as: sizex=maxboundxvoxelsizesizey= maxboundyvoxelsizesizez=maxboundzvoxelsize. Further, the UAV (100) creates a 3D NumPy mesh grid of zeros using above dimensions. The UAV (100) may traverse this grid in all dimensions (let i, j, k) and for every point in the grid and the UAV (100) will calculate its center within the point cloud: pointx, pointy, pointz=i*voxelsize, j*voxelsize, k*voxelsize. The UAV (100) then determines if there exists a voxel at this place or not. If yes, the UAV (100) sets the value of grid (i) (j) (k) as 1.

After all processing has been done, the UAV (100) has a 3D voxel grid where 0 represents the empty space and 1 represents the non-empty space.

Pre-Processing for Clearance: In the UAV (100), a brute force method is utilized to generate a clearance grid for current map. To generate the clearance grid, a previously generated voxel3d grid is used. First, the number of clearance voxels from both side of current voxel is calculated as follow: clearancevoxels=(clearancesize−voxelsize)/(2*voxelsize). In this way, the UAV (100) can determine the number of voxels necessary for clearance around each of its sides. After finding number of clearance voxels, the grid is traversed:
    if the grid[i][j][k]==1
        clearance-grid[i][j][k]=−1
    else
        clearance-grid[i][j][k]=0

The UAV (100) traverses cube of size clearance voxels around the current voxel to check if any voxel from this cube has grid value of 1. If it does then clearance grid value of current voxel is set to −1, or if it does not the clearance grid value of current voxel is set to 0. Thus, after generating clearance grid, the UAV (100) has voxels with value 0 that can be used to determine the path.

A* Algorithm Implementation: A* Algorithm is used to find the optimal path in given graph. This is an informed search algorithm, which means, the UAV (100) has more information about each node other than the graph. The A* search algorithm determines a path from the given source node to the goal node. At each iteration of its main loop, it finds the successors to the current node, then it calculates the approximate total cost for the path if the UAV (100) takes that node using following formula: f (n)=g (n)+h (n), where: f (n)=approximate cost, g (n)=cost of path from the source node to the current node, and h (n)=approximate cost of path from next node to goal node.

To find the approximate cost, a heuristic function is used. Definition of heuristic function may impact the A* search algorithm in run-time as better the heuristic, lesser time will be taken by the algorithm to reach the goal node. After calculating the approximate total cost, the successors and their costs are added to the min-heap. Next successor is chosen with the minimum cost. If the extracted node is the goal node, then A* search algorithm terminates with solution, else it continues with the next iteration. If all nodes from the heap are extracted without getting the solution, it implies that the path from source node to goal node does not exist.

Optimal Path: A* search algorithm always finds the optimal path. The optimal path is the path from the source node to the goal node with the minimum cost. A* search algorithm always adds successors to the min-heap with its cost. The optimal path finding is depicted in the FIG. 5.

Figure 5:
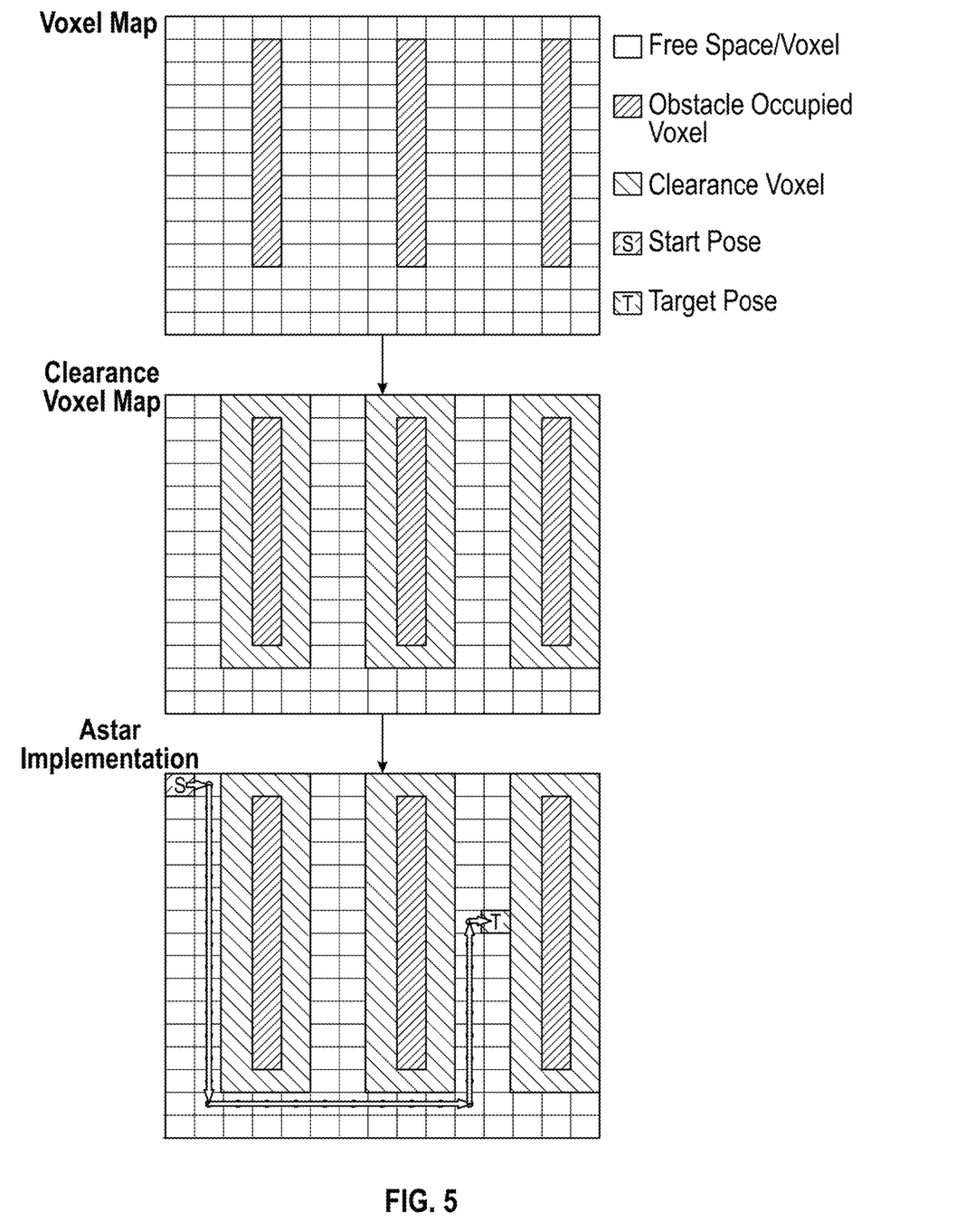
FIG. 5 is an example illustration in which an optimal path finding is depicted, according to embodiments as disclosed herein.

Node A is extracted from the heap. That means the cost C associated with the node A in the heap is the minimum cost to reach to node A from the source node. If there was some other path from the source node to node A with cost C' such that C'<C, then the node A would have cost C' associated within the heap because whenever a different path with lower cost is found for a node that is already present in the heap, the current node is extracted from the heap and the new node with lower cost is added to the heap. Similarly, once the node A is extracted from the heap, it is never added to the heap again as all costs to the remaining nodes in the heap are higher than what it is for node A. Hence, even if we reach to node A again, the cost will be always higher. (Considering costs are positive). Accordingly, in the present case, the UAV (100) will always find an optimal path for the drone from source voxel to the destination voxel.

Data Structures Used: A Min-Heap data structure from python collections is used for this A* search algorithm. A data in min heap is stored in following structure: (f(n), current_voxel, parent_voxel). In this way it is easy to generate a path when goal node is found. Further, a Hash set is used to maintain explored voxels so that the UAV (100) does not visit the same voxels again, getting stuck in an infinite loop. A Hash-map is used to store a predecessor map. Here key is the voxel node and value is its predecessor in current optimal path.

Heuristic Used: A squared 3d Euclidean distance from current voxel to goal voxel is used as the heuristic function. It gives the straight distance from current node to goal node: h((i,j,k))=(i−goali)2+ (j−goalj)2+ (k−goalk)2.

Finding Successors: In each iteration, finding the successor is important. Currently, it has been assumed that UAV (100) moves in x, y, or z direction (diagonal movements are not considered in this algorithm). Again, while selecting the successor, it is required to check if that voxel has sufficient clearance. Hence, successor voxel is added to the min-heap only if its clearance grid value is 0.

Maintaining Data Structure: In each iteration, it is determined if the min-heap is empty or not. If it is empty, then it is concluded that no path exists from source node to goal node. Here we return path flag=False.

In each iteration a node is popped from min heap. If that node is a goal node, a solution is generated using another function and waypoints are returned. If it is not a goal node, then it is added to the visited hash-set and processed further for its successors. Accordingly, a function is called which returns all successors with its cost value (f(n)). Three cases arise for every successor:
(1) A node is available in visited hash-set. In this case it is discarded;
(2) A node is not available in visited hash-set and it is not available in min-heap. In this case, it is added to the min-heap with its cost value and predecessor; or
(3) A node is not available in visited hash-set, but it is available in min-heap. In this case if node in heap has lower cost value, the new node is discarded. If the new node has lower cost value, then the current node in heap is popped out and new node with lower cost value is pushed in heap.

After processing the current node, it is added to the visited hash-set. Also, it is added to the predecessor map to store its predecessor.

Generating Path Waypoints: Once the goal node is extracted from heap, main loop is stopped and the path waypoints generation function is called. In this function a predecessor map is used. The user of the UAV (100) provides a predecessor for goal node. The UAV (100) traverses the predecessor map as follows: waypoints=[ ]node=goalnodewhilenode!=source:waypoints.append (node)node=predecessor_map[node].

Figure 3:
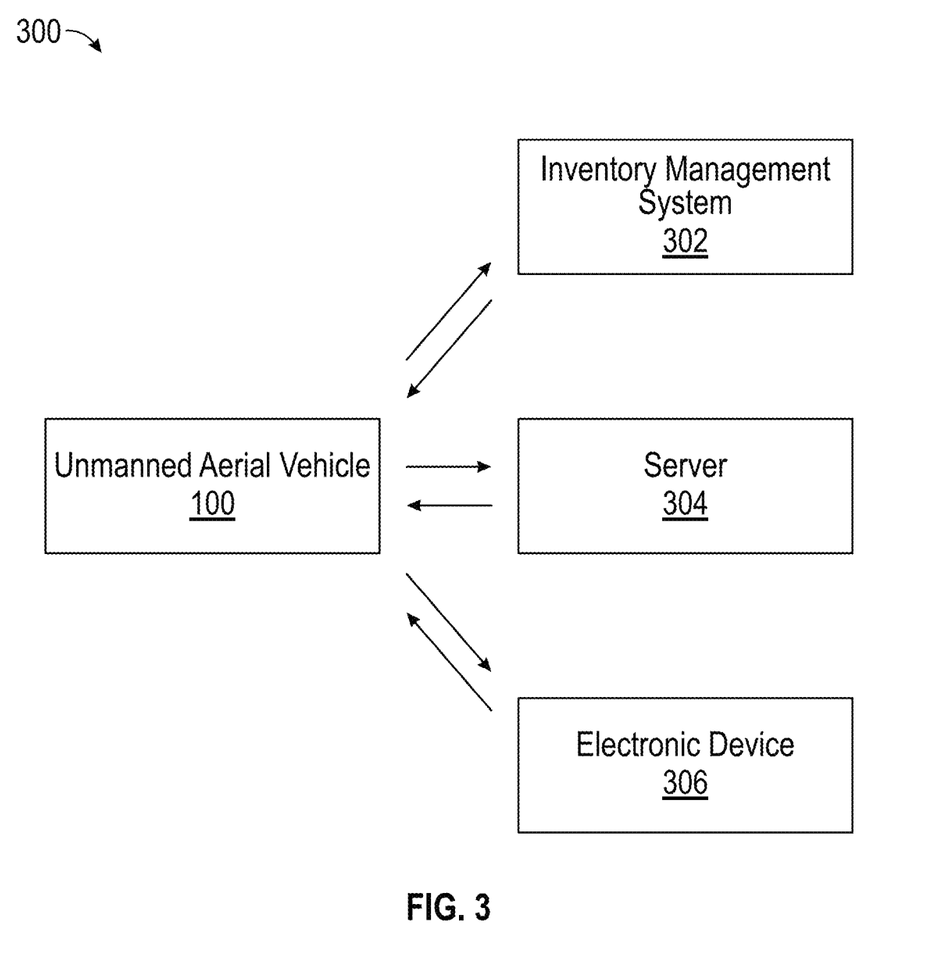
FIG. 3 is an overview of a system in which the UAV is operated with an inventory management system, a server and an electronic device, according to embodiments as disclosed herein.

Further, the UAV (100) includes a scanner (camera) that activates in front of bins to detect a label on inventory within the bin and informs the sever (304) about the inventory data. In another embodiment the UAV (100) includes an RFID reader that detects inventory within the bin and informs the sever (304) about the inventory data. In another embodiment the UAV (100) includes a barcode/QR Code reader that detects and decodes inventory information within the bin and informs the server (304) about the inventory data.

Further, the processor (108) is adapted to execute program instructions stored in the memory (106) and to perform various processes to effect operation of the UAV (100). The communicator (104) is configured for communicating internally between internal hardware components and with external devices via one or more networks. The memory (106) also stores instructions to be executed by the processor (108), and connected cameras/sensors having embedded microcontroller capabilities. Further, at least one of the plurality of modules/controllers may be implemented through an AI model or ML model using the data driven controller (114). A function associated with the AI model/ML model may be performed through the non-volatile memory, the volatile memory, and the processor (108). The processor (108) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning. Being provided through learning means that a predefined operating rule or AI model of a desired characteristic is made by applying a learning algorithm to a plurality of learning data. The learning may be performed in a device itself in which AI according to an embodiment is performed, and/or may be implemented through a separate computing system.

The AI model may comprise a plurality of neural network layers, each layer having a plurality of weight values and performing a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, an automated or autonomous machine) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 1 shows various hardware components of the UAV (100), it is understood that other embodiments are not thereby restricted. In other embodiments, the UAV (100) may include less or more number of components. Further, the labels or names of the components are used only for illustrative purpose and does not limit the scope of the invention. One or more components can be combined together to perform same or substantially similar function in the UAV (100).

FIG. 3 is an overview of a system (300) in which the UAV (100) is operated with the inventory management system (302), a server (304) and an electronic device (306), according to embodiments as disclosed herein. In an embodiment, the system (300) includes the UAV (100), the inventory management system (302), the server (304) and the electronic device (306). The operations and functions of the UAV (100) is described above in conjunction with FIG. 1. The server (304) can be, for example, but is not limited to: a third party server, a cloud server, an edge server, or the like, or a combination thereof. The electronic device (100) can be, for example, but is not limited to: a cellular phone, a smart phone, a Personal Digital Assistant (PDA), a tablet computer, a laptop computer, an Internet of Things (IoT), a virtual reality device, an immersive system, a smart vehicle, or the like, or a combination thereof.

In an embodiment, a web application running on the server (304) or a mobile application running on the electronic device (306) controls the UAV (100). The web application and/or the mobile application provides a friendly user interface that performs the path planning algorithm in a background process over the 3D map created using the SLAM algorithm. It also helps the user of the UAV (100) to monitor the UAV (100) from a remote location, providing some additional features likes drone health monitoring, drone location, current progress, camera feeds, maintenance requirements, etc.

The web application may utilize the Robot Operating System (ROS) via a web-Socket communication protocol. The ROS-topics are used for interaction between a user interface (UI) and the ROS. Further, the web application can provide a mechanism to plan a path in 3D space using the 3D map. The user of the UAV (100) can add waypoints in vector and the Bezier/A* search algorithm will calculate the path based on the points/targets provided by the user of the UAV (100), taking into consideration the obstacles around the path generated and then provide the path to the server (304) for execution. All the points added during the 3D path planning are published as a ROS-topic, the ROS node subscribes to this topic and draws a path accordingly on the 3D space.

The user interface gives visual feedback to the user by showing the 3D map of the environment in which the user wants to plan their flight. The user interface provides real world location of the feedback from the drone as a closed loop system.

The inventory management system (302) and the server (304) are communicatively coupled to the UAV (100), and adapted and arranged to receive data from the UAV (100) indicative of the identified inventory items and corresponding location of each inventory item in the environment. The inventory management system (302) and the server (304) stores the received data from the UAV (100) for subsequent processing.

Figure 4:
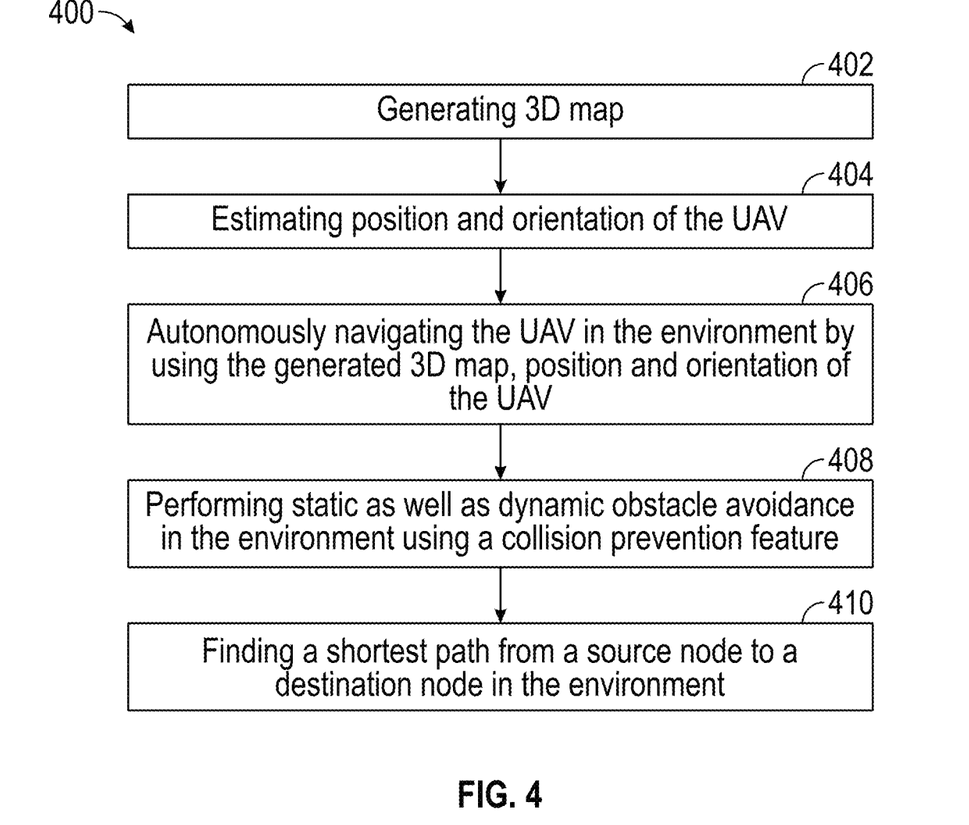
FIG. 4 is a flow diagram illustrating a method for operating the UAV in the inventory management system, according to embodiments as disclosed herein.

FIG. 4 is a flow diagram (400) illustrating a method for operating the UAV (100) in the inventory management system (302), according to embodiments disclosed herein. At 402, the method includes generating the 3D map. At 404, the method includes estimating the position and orientation of the UAV (100). At 406, the method includes autonomously navigating the UAV (100) in the environment (e.g., 3D space) by using the generated 3D map, the position, and the orientation of the UAV (100). At 408, the method includes performing static as well as dynamic obstacle avoidance in the environment using the collision prevention feature. At 410, the method includes finding the optimal path from a source node to a destination node in the environment.

As indicated above, aspects of this invention pertain to specific "method functions" implementable through various programmable devices. In an alternate embodiment, the invention may be implemented as a programmable product for use with a computer system. Those skilled in the art should readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

The invention may be embodied in other specific forms without departing from the spirit of essential characteristics thereof. The described embodiments are therefore to be considered in all respects as illustrative and not restrictive. Accordingly, the scope of the invention is established by the appended claims rather than by the foregoing description. All changes coming within the meaning and range of equivalency of the claims are therefore intended to be embraced therein. Further, the recitation of method steps does not denote a limiting sequence for execution of the steps. Such method steps may therefore be performed in a sequence other than that recited unless the claim expressly states otherwise.

We claim:

1. An unmanned aerial vehicle (UAV) device comprising:
   a processor (108) communicatively coupled with at least one camera (102), a memory (106), at least one sensor (112), an inertial measurement unit (118), and a flight controller (120), the processor (108) adapted to receive and execute stored program instructions to perform the method steps comprising:
   generating a three-dimensional (3D) map of an operating environment;
   estimating a spatial position of the UAV device as a location current node and an orientation of the UAV device within the environment;
   finding an optimal path of travel of the UAV device from a first node within the environment to a second node within the environment by automatically computing waypoints therebetween as the UAV device travels;
   navigating the UAV device within the environment along the optimal path from the first node to the second node, autonomously and dynamically, using a path planning estimate in combination with the waypoints, spatial position estimate, and orientation estimate, while avoiding obstacles encountered along the path within the environment;
   utilizing an obstacle detection algorithm including a minimum allowed distance value as a minimum allowed distance from an obstacle; and
   automatically slowing the UAV device as it approaches an obstacle in response to this minimum allowed distance value.

2. The device of claim 1, the method steps further comprising: accepting, from the inertial measurement unit (118) an estimate of the initial UAV device position to improve the accuracy of an odometry estimate.

3. The device of claim 1, the method steps further comprising: using a graph optimizer algorithm (110) receiving input from a stereo camera (102) for optimization of the spatial position estimate.

4. The device of claim 1, the method steps further comprising: utilizing a loop-closure detection algorithm (116) to allow the UAV device to return to a previous spatial position.

5. The device of claim 1, the method steps further comprising: receiving input data from a stereo camera (102) and generating a UAV odometry data and point cloud data from same; utilizing the point cloud data in generation of the 3D map.

6. The device of claim 1, the method steps further comprising: receiving a sequence of image frame data; and managing the memory (106) utilization by buffering and maintaining a most recent image frame data in a current memory buffer.

7. The device of claim 1, the method steps further comprising: receiving an image frame data; and building a point cloud around the image frame data edges to indicate the device location within the image frame.

8. The device of claim 1, the method steps further comprising: determining the waypoints along the optimal path, wherein the distance between waypoints is reduced in proximity to an obstacle or a tight turn radius on the optimal path; and automatically varying the speed of travel of the UAV device based upon the spacing of the waypoints.

9. The device of claim 1, the method steps further comprising: creating a point cloud of the operating environment; creating the 3D grid data from the point cloud; and determining the optimal path using an A* Algorithm operating on a two-dimensional grid data.

10. A method of operating an unmanned aerial vehicle (UAV), the method steps comprising:
    generating, with a UAV device (100) processor (108) in communication with a memory (106), a three-dimensional (3D) grid map of an operating environment using data from at least one camera (102);
    estimating, with data from an inertial measurement unit (118), a spatial position of the UAV device as a location current node and an orientation of the UAV device within the environment;
    finding an optimal path of travel of the UAV device from a first node within the environment to a second node within the environment by the processor automatically computing waypoints therebetween as the UAV device travels;
    navigating, with a flight controller (120), the UAV device within the environment along the optimal path from the first node to the second node, autonomously and dynamically, using a path planning estimate in combination with the waypoints, spatial position estimate, and orientation estimate, while avoiding obstacles encountered along the path within the environment;
    utilizing an obstacle detection algorithm including a minimum allowed distance value as a minimum allowed distance from an obstacle; and
    automatically slowing the UAV device as it approaches an obstacle in response to this minimum allowed distance value.

11. The method of claim 10, the method steps further comprising: accepting, from the inertial measurement unit (118) an estimate of the initial UAV device position to improve the accuracy of an odometry estimate.

12. The method of claim 10, the method steps further comprising: using a graph optimizer algorithm (110) receiving input from a stereo camera (102) for optimization of the spacial position estimate.

13. The method of claim 10, the method steps further comprising: utilizing a loop-closure detection algorithm (116) to allow the UAV device to return to a previous spatial position.

14. The method of claim 10, the method steps further comprising: receiving input data from a stereo camera (102)

and generating a UAV odometry data and point cloud data from same; and utilizing the point cloud data in generation of the 3D map.

15. The method of claim 10, the method steps further comprising: receiving a sequence of image frame data; and managing the memory (106) utilization by buffering and maintaining a most recent image frame data in a current memory buffer.

16. The method of claim 10, the method steps further comprising: receiving an image frame data; and building a point cloud around the image frame data edges to indicate the UAV device (100) location within the image frame.

17. The method of claim 10, the method steps further comprising: determining the waypoints along the optimal path, wherein the distance between waypoints is reduced in proximity to an obstacle or a tight turn radius on the optimal path; and automatically varying the speed of travel of the UAV device based upon the spacing of the waypoints.

18. The method of claim 10, the method steps further comprising: creating a point cloud of the operating environment; creating the 3D grid data from the point cloud; and determining the optimal path using an A* Algorithm operating on a two-dimensional grid data.

* * * * *

UNITED STATES PATENT AND TRADEMARK OFFICE
CERTIFICATE OF CORRECTION

PATENT NO. : 12,326,736 B2
APPLICATION NO. : 17/818534
DATED : June 10, 2025
INVENTOR(S) : Chithrai Selvakumar Mani and Gaurav Shukla It is certified that error appears in the above-identified patent and that said Letters Patent is hereby corrected as shown below:

In the Specification

Column 6, Line 56; the text "[[s]]" should be deleted.

Signed and Sealed this
Twenty-second Day of July, 2025

Coke Morgan Stewart
*Acting Director of the United States Patent and Trademark Office*